United States Patent
Gerhards et al.

(10) Patent No.: US 10,864,791 B2
(45) Date of Patent: Dec. 15, 2020

(54) LEAF SPRING SUSPENSION FOR WHEELED VEHICLE

(71) Applicant: FORD GLOBAL TECHNOLOGIES, LLC, Dearborn, MI (US)

(72) Inventors: Thomas Gerhards, Niederzier (DE); Alberto Girelli Consolaro, Aachen (DE); Ralf Hintzen, Aachen (DE); Daniel Mainz, Herzogenrath (DE); Rainer Souschek, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 16/164,407

(22) Filed: Oct. 18, 2018

(65) Prior Publication Data
US 2019/0118600 A1 Apr. 25, 2019

(30) Foreign Application Priority Data

Oct. 20, 2017 (DE) .................. 10 2017 218 796

(51) Int. Cl.
*B60G 9/02* (2006.01)
*B60G 11/113* (2006.01)
(Continued)

(52) U.S. Cl.
CPC .............. *B60G 9/02* (2013.01); *B60B 35/007* (2013.01); *B60B 35/08* (2013.01); *B60G 11/04* (2013.01);
(Continued)

(58) Field of Classification Search
CPC ......... B60G 9/02; B60G 11/113; B60G 11/04; B60G 2206/8207; B60G 2206/7101;
(Continued)

(56) References Cited

U.S. PATENT DOCUMENTS

| 4,468,014 A | 8/1984 | Strong |
| 4,630,804 A | 12/1986 | Fesko |

(Continued)

FOREIGN PATENT DOCUMENTS

| EP | 0162189 A1 | 11/1985 |
| EP | 0240676 A1 | 10/1987 |

(Continued)

OTHER PUBLICATIONS

German Patent and Trademark Office, German Search Report for corresponding German Patent Application No. 10 2017218796.4 dated Oct. 23, 2020.

*Primary Examiner* — Darlene P Condra
(74) *Attorney, Agent, or Firm* — Frank MacKenzie; Brooks Kushman P.C.

(57) ABSTRACT

A suspension for a wheeled vehicle include an axle with a mid-section and an end comprising an upper portion and a lower portion defining a space therebetween, a leaf spring having forward and rear ends attached to vehicle structure and a mid-section retained in the space and secured between the upper and lower portions, and a closure element attached to the axle end and at least partially closing an outboard end of the space. The upper and lower axle portions may be formed integrally with the axle mid-section or may be a separately-formed component secured to the axle. The space tapers from a greater vertical dimension at the outboard end thereof to a smaller vertical dimension at an inboard end thereof, and the leaf spring mid-section is wedged into the space. An intermediate element is disposed between the mid-section and at least one of the upper and lower axle portions.

20 Claims, 4 Drawing Sheets

(51) Int. Cl.
*B60B 35/08* (2006.01)
*B60G 11/04* (2006.01)
*B60B 35/00* (2006.01)

(52) U.S. Cl.
CPC ....... *B60G 11/113* (2013.01); *B60B 2360/102* (2013.01); *B60G 2200/326* (2013.01); *B60G 2202/112* (2013.01); *B60G 2204/121* (2013.01); *B60G 2206/428* (2013.01); *B60G 2206/7101* (2013.01); *B60G 2206/8207* (2013.01); *B60G 2800/162* (2013.01)

(58) Field of Classification Search
CPC ........ B60G 2800/162; B60G 2204/121; B60G 2200/326; B60G 2202/112; B60G 2206/428; B60G 11/02; B60B 35/007; B60B 35/08; B60B 2360/102
See application file for complete search history.

(56) References Cited

U.S. PATENT DOCUMENTS

| | | | |
|---|---|---|---|
| 4,732,371 A | 3/1988 | Pflederer | |
| 4,895,350 A | 1/1990 | Schoof et al. | |
| 2010/0270719 A1* | 10/2010 | Ranum | B60G 5/053 267/294 |
| 2011/0204589 A1* | 8/2011 | Reiter | B60B 35/003 280/124.11 |

FOREIGN PATENT DOCUMENTS

| | | | |
|---|---|---|---|
| EP | 0256007 A1 | 2/1988 | |
| GB | 2185088 A * | 7/1987 | ............... F16F 1/20 |
| JP | H0572509 U | 10/1993 | |
| JP | 2010069998 A | 4/2010 | |

* cited by examiner

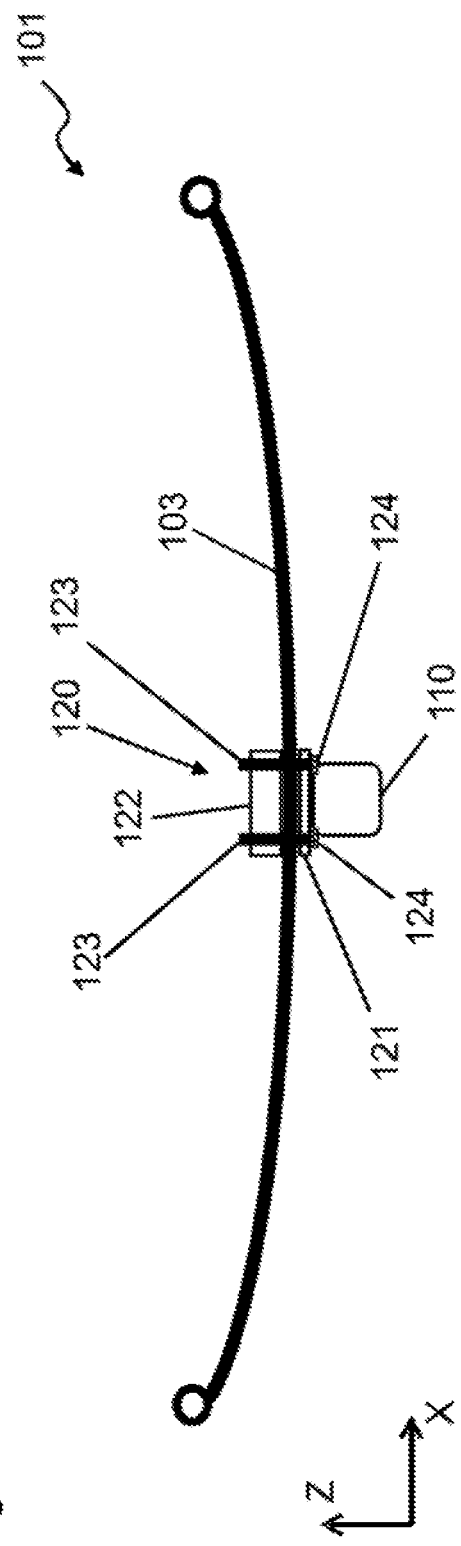
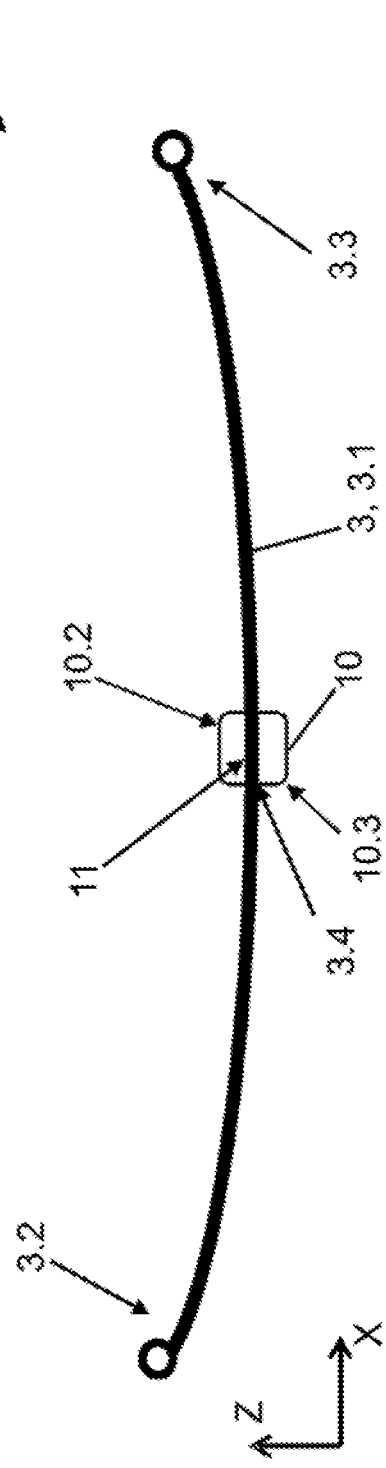

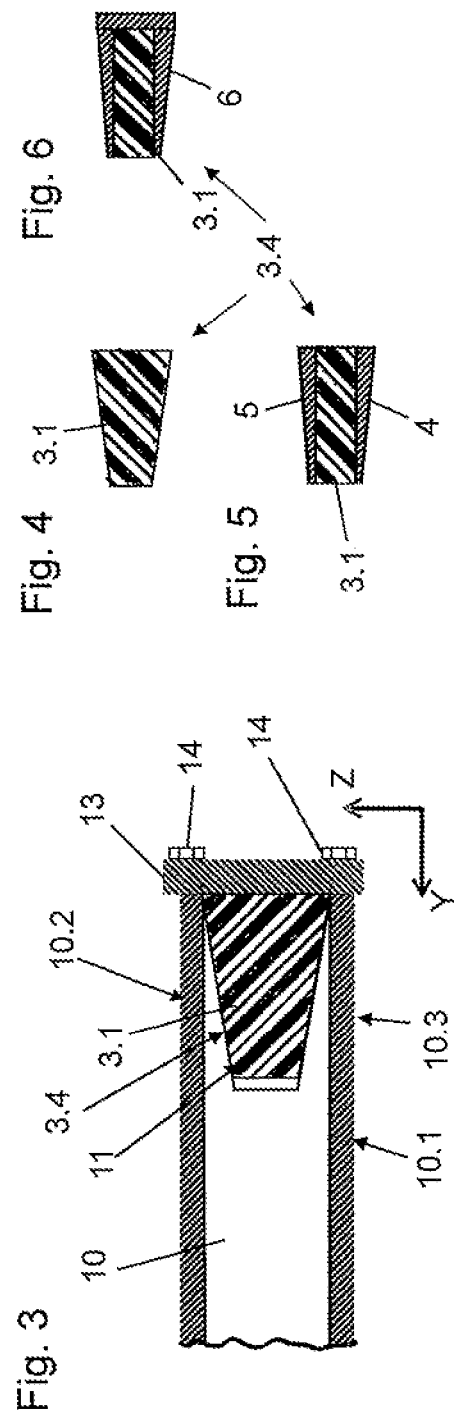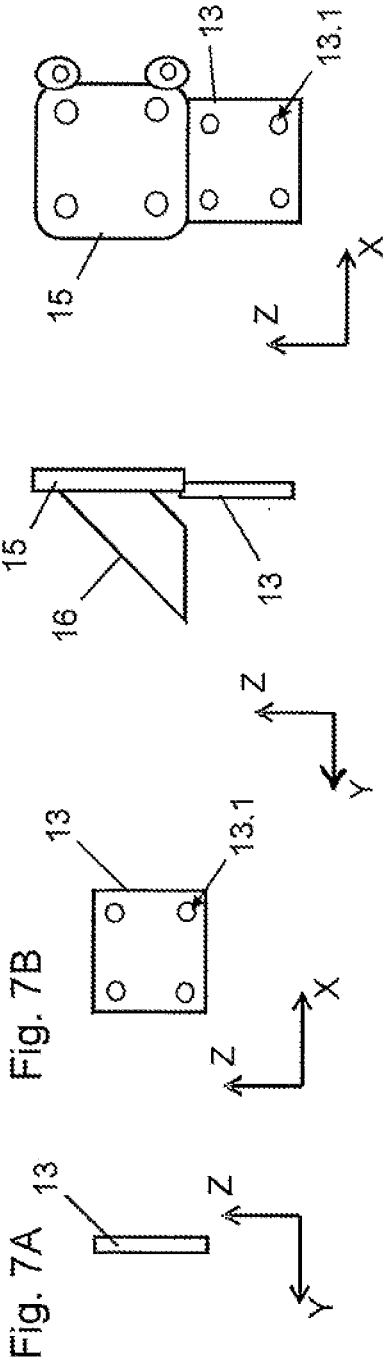

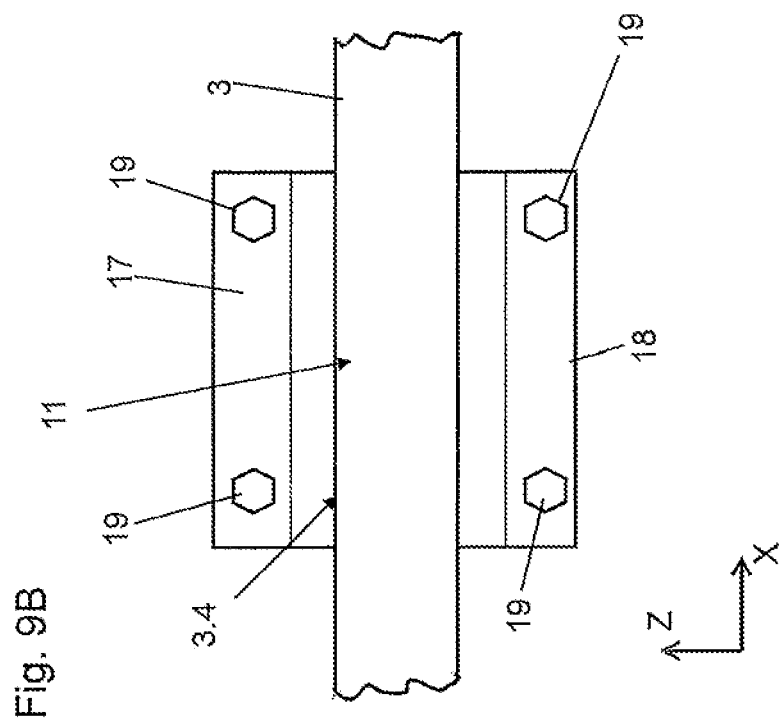
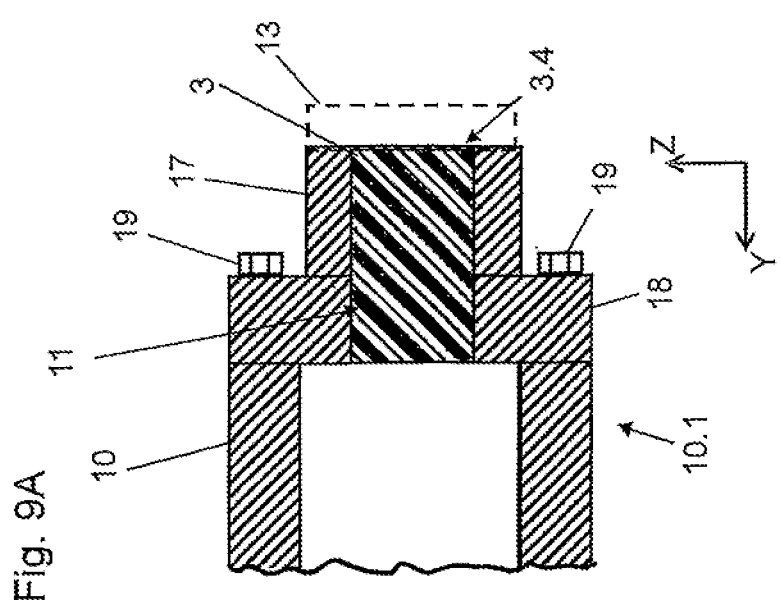

LEAF SPRING SUSPENSION FOR WHEELED VEHICLE

CROSS-REFERENCE TO RELATED APPLICATIONS

This application claims foreign priority benefits under 35 U.S.C. § 119(a)-(d) to DE Application 10 2017 218 796.4 filed Oct. 20, 2017, which is hereby incorporated by reference in its entirety.

TECHNICAL FIELD

The invention relates to a leaf spring suspension for a wheeled vehicle, and to such a suspension having a leaf spring secured to an axle in a novel manner.

BACKGROUND

Different types of springs, by means of which the sprung motor vehicle body is connected to the wheels of the vehicle, are used in the wheel suspension of modern motor vehicles. Among commonly-used types of springs are leaf springs, in particular in the case of rigid axles. A leaf spring extends along the longitudinal axis of the vehicle and, as a rule, is concave-up in form, for example in the manner of a parabola. Along with leaf springs produced from spring steel, leaf springs produced from composite material, for example fiber-reinforced plastics material, are also known. It is also possible to use individual springs or also spring assemblies produced from two or more springs. The at least one spring is connected to the axle to be sprung normally in a center region by means of a clamping device. Typically, in this case, a support produced from steel is welded to the axle. The leaf spring rests on said support, and an elastic pad may be disposed therebetween, where applicable. A further element referred to as a clamping plate (also commonly produced from steel) is positioned at the top side of the leaf spring, where applicable indirectly by means of an elastic pad. As a result of clamping elements such as, for example, spring clamps, the clamping plate is clamped to the support. In this case, the position of the leaf spring is secured in relation to the vehicle axle in part as a result of frictional forces, which are based, in turn, on the clamping forces generated.

Such clamping devices complicate the design of the suspension such that assembly and maintenance become more time-consuming and more expensive. In addition, the use of clamping devices contributes to the increase in mass or weight, as in the majority of cases very sturdy and consequently relatively heavy metal parts have to be used for this purpose. In this case, care must be taken to ensure that the clamping device is part of the unsprung mass which is to be kept as small as possible. Another disadvantage is also that the clamping forces have to be adjusted such that, on the one hand, it is possible to absorb vertical forces, which are caused to a large extent by the weight of the sprung mass, and, on the other hand, horizontal forces which are caused by acceleration and braking operations as well as by cornering. The clamping force, in this case, has to be oriented to the respective maximum force anticipated. Said clamping force is transmitted via the leaf spring, which, in the case of leaf springs produced from composite material, can result in damage or in creepage. In addition, the clamping device demands a considerable amount of installation space in the vertical direction. As a result, the structural possibilities in the region of the respective vehicle axle are restricted, which results, where applicable, in unsatisfactory compromises.

EP 0 162 189 A1 shows a suspension where a leaf spring is clamped against a vehicle axle. It is provided, in this case, that the leaf spring comprises, on a side facing the axle, a series of transverse ribs which correspond with cross grooves realized on the axle. A positive locking closure is produced as a result of the interaction between the transverse grooves and the transverse ribs. As an option, the transverse grooves can be realized on a separately produced intermediate plate which engages the axle by means of a bolt.

U.S. Pat. No. 4,732,371 A shows a spring arrangement where a leaf spring is connected to the vehicle axle by means of a clamping device. A lower plate of the clamping device is welded to the vehicle axle and an upper plate is clamped against the lower plate by means of spring clamps. In order to increase the bending rigidity, the leaf spring comprises a wave-like profile in the region which is clamped between the plates. In addition, grooves, which form a positive locking closure with a rib which is realized on the lower plate, are realized toward the lower plate in the leaf spring.

U.S. Pat. No. 4,468,014 A discloses a vehicle suspension where a leaf spring assembly is clamped against a vehicle axle. The leaf spring assembly consists of three individual leaf springs which are each produced using a composite method of construction. A core of the respective leaf spring consists of a plastics material, whilst an upper and lower surface layer each consist of metal.

U.S. Pat. No. 4,895,350 A discloses a clamping device for a leaf spring where a first clamping element is fastened on a vehicle axis by means of welding. The leaf spring rests on said first clamping element with the interposition of a first rubber element. A second rubber element connects to the top of the leaf spring as does a second clamping element which arches over the leaf spring and the rubber elements. In this case, each rubber element engages the adjoining clamping element in a positive locking manner.

U.S. Pat. No. 4,630,804 A shows a clamping device where a first clamping element is welded to a vehicle axle. The clamping element forms a positive locking receiving means for a first rubber element which, in turn, receives the leaf spring. A second rubber element connects to the top and a second clamping element, which is clamped against the lower clamping element by means of spring clamps, connects thereon. A positive locking closure between the leaf spring and the rubber elements is provided by a profile which changes in the longitudinal direction of the leaf spring.

EP 0 240 676 A1 discloses a clamping device for a leaf spring produced from fiber-reinforced plastics material, having a clamping cage which surrounds the leaf spring body and comprises two cage halves which engage one another in a positive locking manner. The cage halves are pressed against the leaf spring body by means of clamping elements, said leaf spring body being connected at both ends at the point of the clamping device to a mechanically rigid support produced from fiber-reinforced plastics material. Each cage half, in this case, is pressed against a support, surface structures which correspond with one another producing a positive locking closure in the longitudinal direction of the leaf spring.

EP 0 256 007 B1 shows an arrangement with a leaf spring which is produced from a composite material and is clamped against a vehicle axle by means of an upper and a lower clamping element produced from steel. A layer of elastomer material, which is bonded to the leaf spring, is arranged between the leaf spring and the respective clamping element. The bottom layer, in this case, surrounds in part a localizing element produced from metal or hard plastics material which comprises a portion which projects downward. Said projecting portion engages in a positive locking manner in a bore of the lower clamping element.

In view of the prior art indicated, the connection between a vehicle axle and a leaf spring certainly still provides room for improvement. This relates, in particular, to the installation height, the mass or the weight, the complexity of the design and the avoidance of damage to the leaf spring.

SUMMARY

The features and measures mentioned individually in the following description are able to be combined together in an arbitrary and technically practical manner and demonstrate further designs of the invention. The description additionally characterizes and specifies the invention in particular in conjunction with the figures.

A suspension for a vehicle is provided by the invention. The vehicle can be, in particular, a motor vehicle such as a truck, transporter or passenger vehicle. However, it can also be used, for example, for trailers. The suspension is as a rule a rear suspension, in particular featuring a rigid axle.

The suspension comprises a leaf spring, which comprises a main or base portion or spring portion, as well as an axle which is connected thereto. The leaf spring, in this context, is a leaf spring which extends generally along the vehicle longitudinal axis (X-axis). In this case, the leaf spring does not extend strictly parallel to the X-axis (at least whilst in the non-loaded state), but comprises a concave-up curvature, for example in the manner of a parabolic spring. All references to the X-axis (longitudinal axis), Y-axis (transverse axis) and the Z-axis (vertical axis) of the vehicle refer here and below to the properly installed state of the suspension when the vehicle is positioned upright on a level surface. All in all, the leaf spring serves for the springing of the axle in relation to a vehicle body. In this case, "vehicle body" is a collective term for a body, a chassis and, where applicable, a subframe of the respective vehicle, that is to say the parts which normally form the sprung mass of the vehicle.

The main or spring portion, in said context, is that part of the leaf spring which undergoes elastic deformation and so which provides the energy-absorbing function of the spring. It is usually flattened out such that its cross section comprises a greater dimension in the Y direction than in the Z direction. The main portion normally extends along the X-axis, at least over the predominant part of the length of the first leaf spring. The spring portion is normally realized in one piece. It can be produced, for example, from spring steel or, however, from composite material. In particular, it can consist at least in part from fiber-reinforced composite material. All materials where fibers, such as, for example, glass fibers, carbon fibers and/or aramid fibers, are embedded in a polymer matrix for reinforcement (e.g. a plastic or synthetic resin matrix) are considered as fiber-reinforced composite materials. As an option, in this case, further particles, layers or components, which cannot be classified as polymers or as fibers, can be embedded therein or attached thereon. In addition to the spring portion, bearing eyes, which are realized, for example, on the end of the leaf spring, can also consist of composite material.

The axle, in this case, is associated with a vehicle axle, on both sides of which wheels are arranged. The wheels can be arranged in a known manner on wheel carriers so as to rotate, the wheel carriers being fastened, in turn, directly or indirectly on the axle. The axle is normally produced in one piece or consists of elements which are connected together in a substance-to-substance bond (e.g. by means of welding). The axle is usually realized from metal, for example steel. According to a typical design, it is realized as an open or closed hollow profile. Overall, the axle extends along the Y-axis and can extend, in particular at least predominantly, parallel to the Y-axis.

The axle can be connected to the vehicle body by means of the first leaf spring. In this case, different possibilities are provided within the framework of the invention as regards the connection between the leaf spring and the vehicle body. Thus, the first leaf spring can be connected, for example, to the vehicle body at one end (normally the front end) so as to be pivotable and to a connecting arm at the other end (normally a rear end) so as to be pivotable. Said connecting arm, which can also be designated as a shackle, is connected, in turn, to the vehicle body so as to pivotable. Such a design corresponds substantially to a Hotchkiss suspension. The invention, however, is expressly not restricted to such a design.

As is explained further below, however, designs where the body is not connected to the vehicle body by means of the first leaf spring are also conceivable.

According to the invention, an end of the axle is bifurcated into an upper portion or fork and a lower portion or fork, the two portions/forks being fixedly connected to a main or base portion of the axle. A space is defined between the upper and lower portions/fork into which a mid-section of the leaf spring is received. The leaf spring mid-section which fits into the space therefore functions as a connecting portion for securing the axle to the leaf spring. In this case, the upper portion is arranged above the lower holding element with reference to the Z-axis and the space is defined between the two holding elements. The two forks (upper and lower holding elements), in this case, form a positive locking closure with the leaf spring at least in the Z direction, the mid-section of which longitudinal spring is received in the space.

Both the upper and lower portions of the end of the axle are fixedly connected to the axle midsection, on the inside with reference to the Y-axis. The axle mid-section consequently forms, as part of the axle, a common base for both upper and lower portion on which they are fastened. As will be explained again later, the upper and lower axle portions or form can be integrally-form parts of the axle or, alternatively, can be elements which are produced separately from said axle mid-section and secured thereto during assembly. In each case, the upper and lower axle portions/forks are not clamped against the top/bottom surfaces of the axle as, for example, clamping elements in the prior art, but are fastened on the inside of the axle in the Y (vertical) direction. Terms such as "inside" or "inboard" mean here and below in the direction of the vehicle center or of the center axis of the vehicle with reference to the Y-axis. If the respective axle portion/fork is looked at, a region thereof located inboard (toward the vehicle longitudinal center-line) is thus connected with the base portion. It could also be said in this respect that the respective axle end portion, proceeding from the base portion, extends outboard or outward along the Y-axis. In the case of a typical embodiment, both the axle end portions/forks and the space are situated at the height of the base portion (with reference to the Z-axis).

Fastening the upper and lower axle portions on the inside of the base portion according to the invention produces above all two advantages. Firstly, the necessity to arrange the leaf spring and elements of a clamping device above or below the axle is no longer applicable, which allows the installation height overall is able to be reduced. It is possible, in this case, to arrange the leaf spring at the height of the axle. Secondly, the fastening of the upper and lower axle end portions is effected on the axle, not as in the case of a clamping device in the prior art by means of the first leaf spring, but is to a certain extent independent of this. It is consequently possible to transmit only such forces to the leaf spring as are necessary for the positional security thereof. The positional security of the holding elements is to a certain extent decoupled from this. The advantage resulting from this is that the stresses in the leaf spring are able to be decisively reduced. Whilst stress peaks generally occur at the edges of conventional clamping elements, as a result of the new idea and of the accompanying novel design of the support of the spring, completely homogenous stress distribution can be achieved in the ideal case in the interface between the springing and the support. Over and above this, the mass or the weight of the suspension can be reduced in relation to the prior art. Generally speaking, the number of parts is reduced compared to a conventional connection by means of a clamping device, as a result of which the assembly is simplified and costs can be saved. In addition, compared to the prior art it is simpler to connect springs that are wide (in the Y direction) to the vehicle axle, which is advantageous, in particular, in the case of springs produced from composite material.

According to an advantageous embodiment, the upper and lower axle portions are fabricated in one piece with the axle, wherein the space is an incision in the axle which extends inward/inboard along the Y-axis. It could also be said that the upper and lower axle portions are formed by the axle. That is to say in the case of said design, an end-side incision, which extends inward along the Y-axis, is produced within the framework of the production of the axle, for example as a result of a separation or cutting process. If the axle is realized as a hollow profile, parts can be cut, for example, out of the profile wall, as a result of which the space is formed. Said design is advantageous insofar as no additional parts are necessary and optimum force transmission is ensured as a result of the upper and lower axle portions being realized in one piece with the axle. In the case of said design, the leaf spring is arranged with the connecting portion or mid-section inside the axle. It can be inserted into the space from the end of the axle during the assembly process.

A closure element, which closes the space (at least in part) adjacent an outboard end of the axle (in the direction of the Y-axis), is advantageously fastened at least indirectly on the axle. The closure element can be screw-connected, for example to the axle, however, other positive locking, non-positive locking and/or substance-to-substance connections are also conceivable. The connection can also be provided indirectly by means of an interposed additional element. For example, in the case of designs in which the upper and lower axle portions are not part of the axle, the closure element can be connected directly to the upper and lower axle portions and consequently indirectly to the axle. "Outward" means in this connection continuing from the center of the vehicle. The function of the closure element, in this case, consists in producing a positive locking connection with the leaf spring once it has been introduced into the space, this preventing, as a result, the leaf spring being able to move sideways out of the space. It is also possible, in this case, for the closure element to be pre-stressed against the leaf spring and to press said leaf spring to a certain extent into the space. The closure element is normally realized overall in a rigid and comparably sturdy manner, which is why it can consist of metal, e.g. steel or aluminum. However, other materials, such as, for example, fiber-reinforced composite materials, can also be used. It must be noted, in this case, that the closure element is arranged to a certain extent to the side of the leaf spring and generally does not absorb vertical forces which are transmitted via the leaf spring between the vehicle body and the axle. Consequently, it does not have to have the same stability as, for example, clamping elements in the prior art and can be designed in a lighter manner. The closure element is realized in a plate-shaped manner according to a simple design.

The function of the closure element does not have to be restricted to the positive locking securement of the leaf spring. According to a further development of the invention, the closure element comprises a wheel carrier for the attachment of a wheel. Said wheel carrier is fixed on the closure element, that is to say is connected to the closure element so as to be fixed in position. The wheel carrier normally comprises a recess for receiving the wheel hub of the vehicle wheel. In addition, the wheel carrier can comprise a brake carrier plate, on which a brake caliper can be fastened. The wheel carrier can comprise bores, through which screws are guided, by means of which, for example, the brake caliper is secured. In a preferred manner, the wheel carrier is connected to the closure element in a substance-to-substance bond. It can be realized, for example, in one piece with the closure element or it can be welded on as a separately prefabricated part.

According to one design, the spring mid-section is connected to an intermediate element, which is arranged between the mid-section and at least one of the upper and lower axle portions. In the case of the design shown, the connection between the intermediate element and the mid-section can be of the positive locking, non-positive locking and/or substance-to-substance bonding type. For example, the intermediate element could be bonded on or vulcanized onto the leaf spring. It can also be fitted onto the mid-section in a preceding assembly. Generally speaking, however not necessarily, the intermediate element is produced from a different material to the leaf spring. The function of the intermediate element can consist in distributing forces which are generated in the mid-section between the axle and the leaf spring in a better manner in order consequently to prevent, for example, local overload of the leaf spring. In this case, the intermediate element can comprise greater elasticity than the leaf spring and for example can consist of an elastomer. As an alternative to this, it could also consist of a material with less elasticity, for example metal, if the spring portion consists of fiber-reinforced plastics material. In a preferred manner, at least one intermediate element is arranged between the axle mid-section and each of the upper and lower axle portions. In addition, at least one intermediate element can be arranged between the mid-section and the closure element. This can be a single intermediate element which surrounds the mid-section to a certain extent on three sides and is consequently arranged between said mid-section and both upper and lower axle portions and the closure element.

According to a preferred embodiment, the space is tapered inward along the Y-axis. That is to say the space becomes narrower toward the vehicle center. This refers, in particular, to the height of the space, that is to say to the dimension in the Z direction which decreases toward the center. In this case, a lower boundary of the upper axle portion and an upper boundary of the lower axle portion extend at an angle to the X-Y plane. The space or its cross section, in this case, can also be designated as wedge-like. If, during assembly, the leaf spring is inserted from the outboard end of the axle into the space, it can thus be a wedge-fit to a certain extent if the leaf spring and the space have suitable dimensions that are complementary to one another. As a result, any play in the direction of the vertical or Z-axis can ideally be eliminated and the stress in the axle mid-section can be calibrated and homogenized.

As an alternative to this or in particular in addition to it, it can be provided that the mid-section is tapered inward along the Y-axis. In other words, a height of the mid-section decreases inward along the Y-axis. In this case, surfaces realized at the top and the bottom of the mid-section (in the Z direction) can be beveled or set at an angle in relation to the X-Y plane. In the case of said embodiment also, the leaf spring is wedged inside the space during assembly (insofar as the dimensions of the leaf spring and of the space are suitably matched to one another). Insofar as, as described above, an intermediate element is provided which is connected to the mid-section, the intermediate element can be tapered, whilst the mid-section comprises a constant height per se along the Y-axis.

As an alternative to the embodiment shown above where the upper and lower axle portions are formed by and with the axle, the upper and lower axle portions can be parts of a holding device which is produced separately from the axle and is fastened on the outboard end of the axle. The holding device, in this case, is fastened more precisely on the main or base portion of the axle. In this case, the holding device can be realized with one or multiple parts, for example in such a manner that both upper and lower axle portions are fastened on the axle or on the base portion of the same as separately prefabricated parts. In this case too, it is possible to provide an above-described closure element which can be connected to the upper and lower holding portions before they are connected to the axle or can even be realized in one piece with said upper and lower axle portions. In a preferred manner, in this case, it can be provided that the leaf spring is introduced into the space between the upper and lower axle portions before the holding device is attached to the base portion. That is to say within the framework of the assembly, an assembly produced from the holding device and the leaf spring can be put together first of all before the assembly is mounted as one unit on the axle. The upper and lower portions of the holding device can be connected to the axle in particular in a positive locking and/or non-positive locking manner, for example as a result of screw connection.

It may be advantageous in the case of the above-described design with a separately produced holding device for the leaf spring to be connected with a substance-to-substance bond to at least one holding element. The substance-to-substance connection can be realized, for example, by bonding-on or vulcanizing-on. It would be conceivable, in this case, for example, for the two holding elements to be bonded to the leaf spring at the top and at the bottom in a sandwich-like manner before the assembly formed in this manner is fastened as a whole to the axle.

Forces between the leaf spring and the axle which act in the longitudinal direction (parallel to the vehicle X-axis) must be absorbed in such a manner that no (appreciable) displacement of said elements with respect to one another takes place. In some embodiments, such forces in the direction of the X-axis can be absorbed by a (where applicable indirect) substance-to-substance bond and/or a non-positive locking closure between the leaf spring and the axle. A positive locking closure is, however, particularly advantageous. According to a preferred embodiment, in the region of the mid-section of the leaf spring comprises at least one retaining feature which projects in the direction of the Z-axis and produces a positive locking closure between the leaf spring and at least one of the upper and lower axle portions in the direction of the X-axis. Such a retaining feature projects in the Z direction in relation to adjacent portions of the leaf spring, that is to say upward and/or downward. It could also be said that the retaining feature protrudes in the Z direction. The positive locking closure, in this case, is normally generated as a result of the extent of the retaining feature in the Z direction being greater than that of the space in an adjacent (in the X direction) region, which is why the retaining feature cannot be guided through said adjacent region. The respective retaining feature is produced in a preferred manner in one piece with the adjoining parts of the leaf spring. It can be realized, for example, as a lug, web or bead.

In order to produce the positive locking closure, the retaining feature has to be located adjacent to the upper and lower axle portions. In this case, at least one retaining feature is arranged in a preferred manner inside and/or outside the space. If the retaining feature is arranged outside the space, it is arranged in front of or behind the respective upper/lower axle portion along the X-axis. It can consequently only prevent displacements in one direction (forward or rearward) and a further retaining feature is necessary which can be arranged, for example, symmetrically with reference to the axle. Insofar as the space widens inside the axle, for example when the axle is realized as a hollow profile and the space is formed by an incision in the wall of the hollow profile, a retaining feature can be arranged in the widened region, as a result of which longitudinal displacements in both directions are able to be prevented. It is obvious that in this case too, the positive locking closure can be supplemented or improved by additional retaining features which are arranged outside the space.

The leaf spring described above can also be a first leaf spring of a two-step spring system. According to such a design, a second leaf spring is connected to the axle by a clamping device and is at a spacing from said first longitudinal spring with reference to the Z-axis. In this case, it is possible for the first leaf spring not to be connected directly to the vehicle body, but for the second leaf spring, for example in the manner of a Hotchkiss suspension, to be connected to the vehicle body. That is to say the second leaf spring serves for the connection to the vehicle body and consequently constantly contributes to the spring system. The first leaf spring, on account of its shaping, experiences deformation, for its part, only when the second leaf spring undergoes serious deformation. That is to say the first leaf spring only generates a restoring force when it undergoes more serious deformation, that is to say in the case of a greater (static or dynamic) axle load. In this case, the first leaf spring generally comprises a smaller curvature than the second leaf spring. In any event, under normal load the ends of the first leaf spring are at a spacing from the second leaf spring and move into contact (as an option by means of interposed damper elements) with the second leaf spring when the curvature thereof decreases under a greater load. In the case of the design shown, the first leaf spring can be realized from composite material, whilst the second leaf spring is produced from spring steel. The latter is less sensitive to static clamping forces than composite material, which is why conventional fastening by means of a clamping device is able to be effected here without having to fear damage to the second leaf spring. It is obvious that the entire installation height of the suspension can be reduced as a result of arranging only the second leaf spring above or below the axle, whilst the first leaf spring can be arranged at the height of the same.

Further advantageous details and effects of the invention are explained in more detail below by way of exemplary embodiments shown in the figures, in which:

BRIEF DESCRIPTION OF THE DRAWINGS

FIG. 1 shows a side view of a suspension according to the prior art.

FIG. 2 shows a side view of a first disclosed embodiment of a suspension;

FIG. 3 shows a sectional representation of part of the suspension from FIG. 2;

FIG. 4 shows a sectional representation of a leaf spring of the suspension from FIG. 2;

FIG. 5 shows a sectional representation of a second disclosed embodiment of a mid-section for a leaf spring;

FIG. 6 shows a sectional representation of a third disclosed embodiment of a mid-section for a leaf spring;

FIGS. 7A, 7B show views of a closure element of the suspension from FIG. 2;

FIGS. 8A, 8B show views of a closure element according to a fourth embodiment;

FIGS. 9A, 9B show views of part of a suspension according to a fifth embodiment;

DETAILED DESCRIPTION

Figure 10:
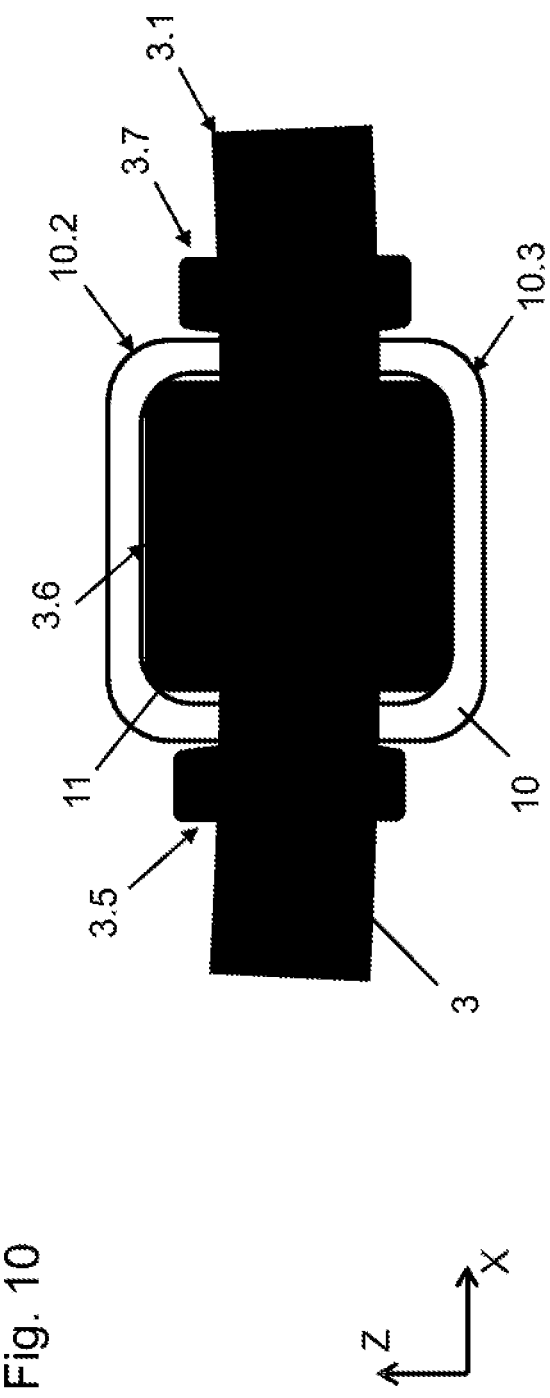
FIG. 10 shows a sectional representation of part of a suspension according to a sixth embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Identical parts are always provided with the same reference symbols in the various figures, which is why they are, as a rule, also only described once.

FIG. 1 shows in a highly simplified and schematic manner a suspension 101 according to the prior art which can be used, for example, in a truck. In this case, an axle 110 of is movably connected to a vehicle body (not shown) by a leaf spring 103 oriented generally along the longitudinal axis (X-axis) of the vehicle. The description "along the longitudinal or X-axis" is defined to mean that, at least in the unloaded state, the leaf spring may not be truly parallel to the X-axis. Rather, the leaf spring is generally curved somewhat, for example in the manner of a parabolic spring (as is well known in the automotive arts). Further, the forward and rear ends of the leaf spring are not necessarily disposed at the same height relative to the vehicle Z-axis. Wheel carriers (not shown either) are connected to the axle 110, as is well known in the art. The leaf spring 103 comprises bearing eyes at its forward and rear ends, by means of which it is connected to the vehicle body (either directly or by means of a connecting arm or shackle) so as to be pivotable.

The connection between the leaf spring 103 and the axle 110 is effected, in this case, by means of a clamping device 120, which comprises a first or lower clamping element 121 which is produced from steel and most commonly is welded to the top surface of the axle 110. The leaf spring 103 rests on the lower clamping element 121 and is clamped against the lower clamping element by means of a second or upper clamping element 122. The clamping is effected, in this case, by means of spring clamps 123, which are secured with nuts 124 on the underside of the first clamping element 121. The clamping device 120, in this case, has firstly to absorb the vertical forces between the leaf spring 103 and the axle 110. Secondly, sufficient friction has to be generated by the clamping between the leaf spring 103 and the clamping elements 121, 122 in order to prevent relative displacement in the direction of the X-axis. The clamping forces necessary for this can result in damage to the leaf spring 103 if it is produced of composite material.

FIG. 2 shows a side view of a suspension 1 according to a first embodiment of the invention. In this case, an axle 10 is movably connected to a vehicle body (not shown) by means of a leaf spring 3 which may advantageously be produced from a composite material, such as for example a fiber-reinforced composite. The axle 10 may be realized as a hollow profile produced from steel. A front end 3.2 of the leaf spring 3 comprises a first bearing eye, by means of which it is connected to the vehicle body so to be pivotable with respect thereto. A rear end 3.3 of the leaf spring 3 comprises a further bearing eye, by means of which it is connected to the vehicle body so as to be pivotable (normally by means of a connecting arm, not shown). An elongated spring portion 3.1, with which the above-mentioned bearing eyes may be realized in one piece, extends between the two ends 3.2, 3.3. The spring portion 3.1 is essentially responsible for the resilient, energy-absorbing function of the leaf spring 3.

As can be seen in FIG. 2 and in particular in the sectional representation in FIG. 3, a mid-section 3.4 (located at the approximate center of the spring portion 3.1) serves as a connecting portion which is received in a space 11 defined between an upper portion 10.2 and a lower portion 10.3 of the axle. In the depicted embodiment, the upper and lower portions 10.2, 10.3 are formed in one piece with a main or base portion 10.1 of the axle 10. In this case, the space 11 extends inwardly (along the Y-direction) from the outboard end of the axle 10. The leaf spring 3 can be inserted along the Y direction so that the mid-section 3.4 fits into the space 11, for example from an outboard end of the axle 10 toward a lateral (left/right) center of the vehicle. In this illustrated embodiment, the space 11 is tapered in a wedge-shaped manner, decreasing in height (as measured along the Z-axis) as it extends inboard into the axle 10. This wedge-like taper matches or is complementary to that of the leaf spring mid-section 3.4. The outboard end of the space 11 (that is, the end of the space 11 adjacent to the outboard end of the axle 10) is closed-off (at least partially) by a closure element 13 (shown on its own in FIGS. 7A and 7B), which is fastened to the upper and lower axle portions 10.2, 10.3 by, for example, bolts 14. The closure element 13 has been omitted in FIG. 2 for reasons of clarity.

The closure element 13, in this case, forms a positive locking closure in relation to the leaf spring 3 and at the same time exerts pressure on the leaf spring, pressing the leaf spring along the Y-axis into the space 11. The leaf spring 3 is received into the end of the axle 10 in a tight, play-free manner as a result of the complementary wedge shapes of the mid-section 3.4 and of the space 11. As an option, frictional forces can be generated as a result between the mid-section 3.4 and the holding elements 10.2, 10.3 ensuring a non-positive closure in the X direction. The respectively wedge-shaped tapering of the space 11 and of the axle mid-section 3.4 is optional and not required for the functioning of the suspension 1 according to the invention. Thus, forces are also able to be absorbed in the X-direction for example also by means of a positive locking closure, as will be explained again below with reference to an alternative design embodiment.

FIG. 4 shows the mid-section 3.4 of the leaf spring 3 once again on its own. In the illustrated embodiment, it is formed by the spring portion 3.1 which is produced from fiber-reinforced composite material and comprises a wedge-shaped or tapered cross section in said region. As shown in FIGS. 5 and 6, the cross section of the mid-section 3.4 can, however, also be rectangular, with one or multiple intermediate elements 4-6 being connected to the mid-section 3.4. In FIG. 5, two intermediate elements 4, 5 are bonded to the top and bottom to the mid-section 3.4. The intermediate elements 4, 5 can consist of a material which comprises lesser elasticity than the spring portion 3.1, or, alternatively, of a material which comprises greater elasticity. In each case, they contribute to distributing forces (generated during operation of the vehicle) between the upper and lower axle portions 10.2, 10.3 and the mid-section 3.4 in a more uniform manner and consequently prevent damage to the same. They could consequently also be described as "buffer elements" or "protective elements." At the same time, the intermediate elements 4, 5 provide an overall wedge shape of the mid-section or connecting portion 3.4 as a result of their tapering form.

FIG. 6 shows an single intermediate element 6 which has a generally U-shaped cross section so that it extends around the top, the bottom and the outboard surfaces of the mid-section 3.4. It may also be bonded to the mid-section 3.4. Compared to the intermediate elements 4, 5 in FIG. 5, said single element 6 can also absorb forces introduced by the closure element 13 and distribute them better to the mid-section 3.4. The fastening of the intermediate elements 4, 5, 6 by means of bonding provides just one option and other substance-to-substance, non-positive locking and/or positive locking types of connections can be chosen.

FIGS. 7A and 7B show the closure element 13 once again on its own, the direction of view in FIG. 7A corresponding to the X-axis and in FIG. 7B to the Y-axis. The closure element 13 in this depicted embodiment is a rectangular steel plate which comprises bores 13.1 for the screws 14. As the closure element 13 is required to absorb only horizontal forces from the leaf spring 3, it can be fabricated in a substantially material-saving and lighter manner than, for example, the clamping elements 121, 122 according to the prior art described in FIG. 1.

FIGS. 8A and 8B show an alternative design of a closure element 13 which is connected to a wheel carrier 15. The closure element 13 and the wheel carrier 15 can be fabricated as a unitary component (by casting, for example) or can be produced separately and welded (or otherwise fastened) together. In order to prevent the wheel carrier 15 buckling in relation to the closure element 13 when stronger forces are introduced from the vehicle wheel, it is possible to provide a support element 16 which extends inboard to bear against the axle. Support element 16 may, for example, be a square tube.

FIGS. 9A and 9B show views of a detail of a suspension according to the invention according to a further embodiment, where the axle 10 is realized to a certain extent in a conventional manner and the base portion 10.1 provides an end region with an end surface which extends parallel to the X-Z plane. Separately produced upper and lower axle portions 17, 18 are fastened to the axle base portion 10.1 by means of screws 19. A space 11 is defined between said upper and lower axle portions 17, 18 and the mid-section 3.4 of the leaf spring fits into and is secured in the space so that the mid-section serves as a connecting portion. It can be provided, in this case, that the upper and lower axle portions 17, 18 are bonded to the leaf spring 3 before the entire assembly is screwed onto the base portion 10.1. All the horizontal forces, that is to say in the X direction and in the Y direction, are absorbed by the substance-to-substance bond. As an alternative to this, however, it is also possible for a closure element 13 to be provided on the outside here too. Said closure element could be screw-connected to the upper and lower axle portions 17, 18. As an alternative to this, however, the three components 13, 17, 18 could be connected together in a substance-to-substance bond. In particular, one-piece production would be conceivable. In this case, the leaf spring would first be inserted into the space 11 and subsequently the assembly would be screw-connected to the base portion 10.1.

As already indicated above, forces acting in the direction of the X-axis can also be absorbed by means of a positive locking closure. A corresponding design, which represents a sectional representation of part of a suspension 1 according to a further embodiment, is shown in FIG. 10. In this connection, the leaf spring in the region of the mid-section (connecting portion) 3.4 comprises multiple retaining features or bulges 3.5 to 3.7 which project generally vertically (in or parallel with the direction of the Z-axis) from the surface contour of the leaf spring. Each of the retaining features or bulges 3.5 to 3.7, in this case, projects both upward and downward. Two retaining features or bulges 3.5, 3.7, in this case, are arranged outside the space 11, whilst a third retaining feature or bulge 3.6 is arranged inside the space. Overall, a positive locking closure, which prevents displacement in the direction of the X-axis, is produced in this manner with the upper and lower axle portions 10.2, 10.3. In a preferred manner, the retaining features or bulges 3.5 to 3.7 are fabricated in one piece with the spring portion 3.1.

Figure 11:
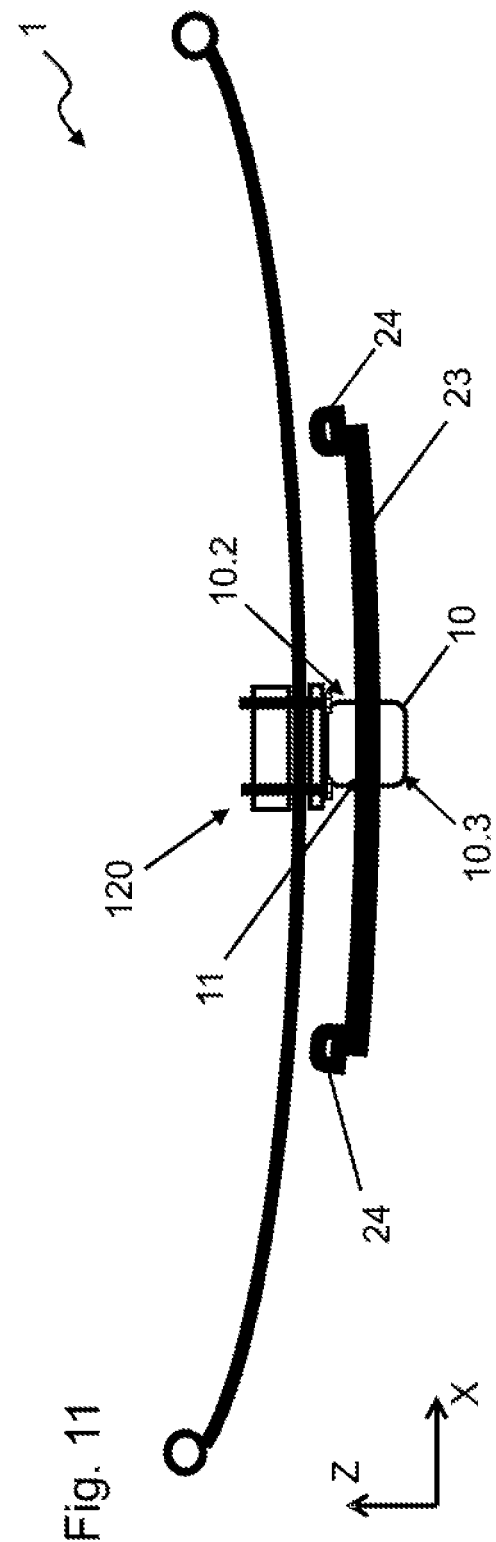
FIG. 11 shows a side view of a suspension according to a seventh embodiment.

FIG. 11 shows a side view of a suspension 1, where two leaf springs 23, 33 are connected to the axle 10. A first leaf spring 23, in this case, is produced from composite material and, as described with reference to FIG. 2, is received between upper and lower axle portions 10.2, 10.3. As an alternative to this, separately produced upper and lower axle portions 17, 18 could also be used. A second leaf spring 33 is arranged above the axle 10 and is clamped against the axle 10 by means of a clamping device 120 which functionally corresponds to that shown in FIG. 1. In this case, the second leaf spring 33 can be produced from spring steel such that no damage is to be feared as a result of the clamping forces generated. The two leaf springs 23, 33 form parts of a two-step spring system, the connection to the vehicle body being provided by the second leaf spring 33. In the case of normal load, which is shown in FIG. 11, no forces act from the vehicle body onto the first leaf spring 23. This does not change until a certain limit load is exceeded (for example when the truck or transporter is heavily loaded), when the second leaf spring 33 stretches and comes into contact with the first leaf spring 23 by means of rubber pads 24 provided at the end of said first leaf spring 23. The first leaf spring 23 also deforms elastically from said point, which results in an increased spring rate. On account of the arrangement of the first leaf spring 23 at the height of the axle 10, the installation height of the suspension 1 overall is lower.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A suspension for a vehicle, comprising:
   an axle having a mid-section and an end comprising an upper portion and a lower portion defining a space therebetween;
   a leaf spring having forward and rear ends attached to vehicle structure and a mid-section retained in the space and secured between the upper and lower portions; and
   a closure element attached to the axle end and at least partially closing an outboard end of the space.

2. The suspension of claim 1, wherein the upper and lower portions of the axle are formed integrally with the axle mid-section.

3. The suspension of claim 1, wherein the space tapers from a greater vertical dimension at the outboard end thereof to a smaller vertical dimension at an inboard end thereof, and the leaf spring mid-section is wedged into the space.

4. The suspension of claim 1, further comprising an intermediate element disposed between the leaf spring mid-section and at least one of the upper and lower axle portions.

5. The suspension of claim 1, wherein the axle outboard end comprises a holding element fabricated separately from the axle mid-section and fastened thereto, and the holding element comprises the upper and lower portions.

6. The suspension of claim 1, wherein the leaf spring further comprises at least one retaining feature projecting vertically from the leaf spring mid-section and engaging at least one of the upper and lower portion to restrain against relative lateral movement between the axle and the leaf spring.

7. The suspension of claim 1, further comprising a second leaf spring connected to the axle by a clamping device and vertically spaced from the clamping device.

8. A suspension for a vehicle, comprising:
   an axle having a mid-section and at least one end comprising an upper portion and a lower portion defining a space therebetween; and
   a leaf spring having forward and rear ends attached to vehicle structure and a mid-section retained in the space and secured between the upper and lower portions.

9. The suspension of claim 8, wherein the upper and lower portions of the axle are formed integrally with the axle mid-section.

10. The suspension of claim 8, further comprising a closure element attached to the end of the axle and at least partially closing an outboard opening of the space.

11. The suspension of claim 10, wherein the closure element comprises a wheel carrier for attaching a wheel to the axle.

12. The suspension of claim 8, wherein the space tapers from a greater vertical dimension at an outboard end thereof to a smaller vertical dimension at an inboard end thereof, and the leaf spring mid-section is wedged into the space.

13. The suspension of claim 8, further comprising an intermediate element disposed between the leaf spring mid-section and at least one of the upper and lower axle portions.

14. The suspension of claim 8, wherein the axle outboard end comprises a holding element fabricated separately from the axle mid-section and fastened thereto, and the holding element comprises the upper and lower portions.

15. The suspension of claim 8, wherein the leaf spring further comprises at least one retaining feature projecting vertically from the leaf spring mid-section and engaging at least one of the upper and lower portion to restrain against relative lateral movement between the axle and the leaf spring.

16. A suspension for a vehicle, comprising:
   an axle having an end comprising upper and lower portions; and
   a leaf spring having a mid-section secured within a space defined between the upper and lower portions.

17. The suspension of claim 16, wherein the upper and lower portions of the axle are formed integrally with an axle mid-section.

18. The suspension of claim 16, wherein the space tapers from a greater vertical dimension at an outboard end thereof to a smaller vertical dimension at an inboard end thereof, and the leaf spring mid-section is wedged into the space.

19. The suspension of claim 16, further comprising an intermediate element disposed between the leaf spring mid-section and at least one of the upper and lower axle portions.

20. The suspension of claim 16, wherein the axle end comprises a holding element fabricated separately from an axle mid-section and fastened thereto, and the holding element comprises the upper and lower portions.

* * * * *